Oct. 26, 1943.   A. P. JAHANT   2,332,641
COUPLING
Filed May 23, 1941   2 Sheets-Sheet 1
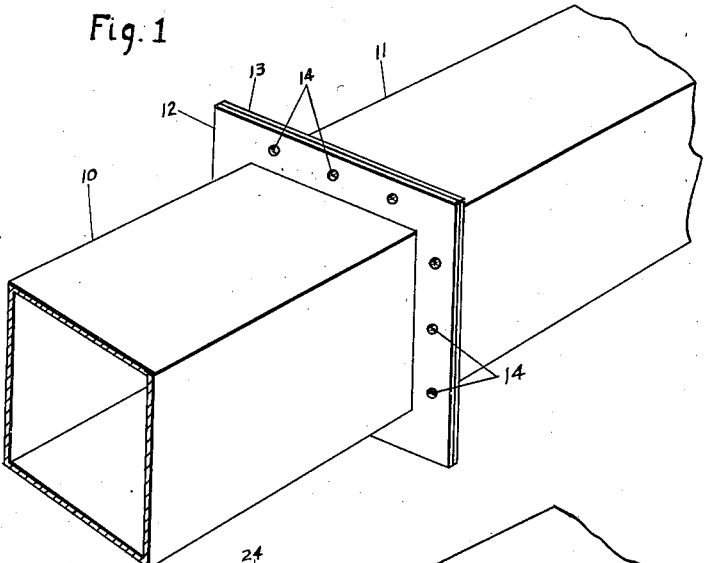
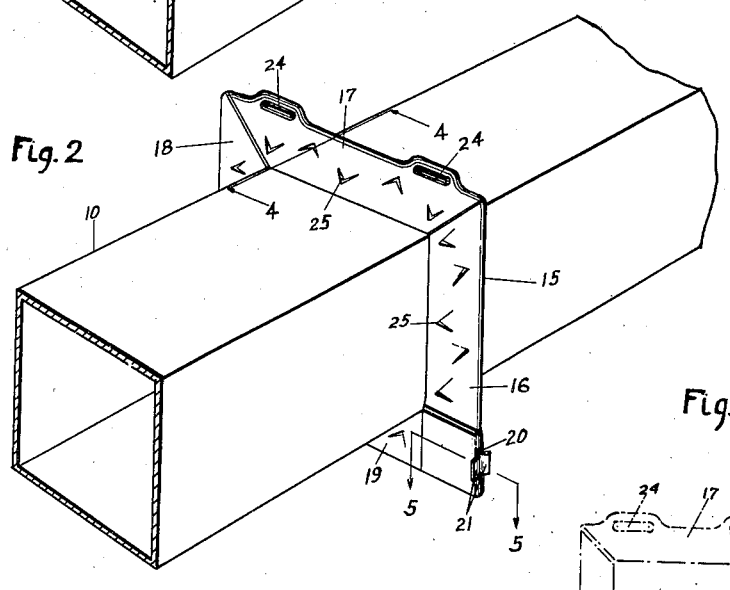
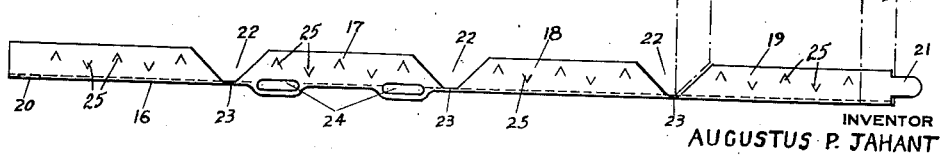
INVENTOR
AUGUSTUS P. JAHANT
BY
ATTORNEYS

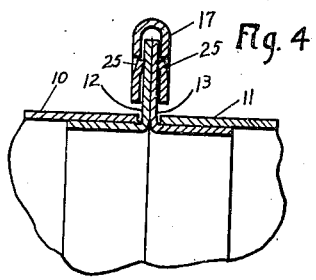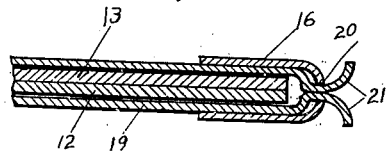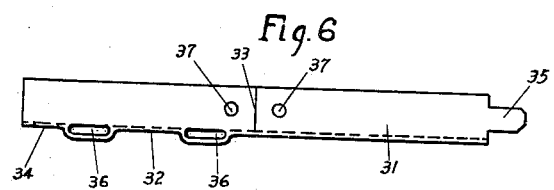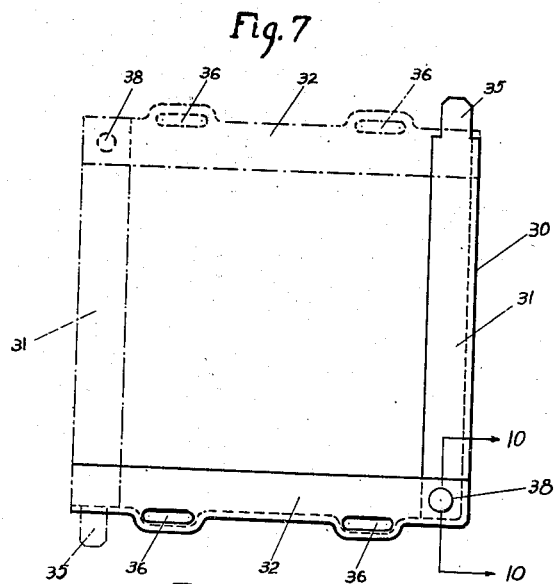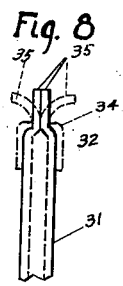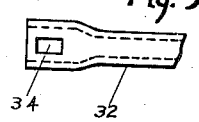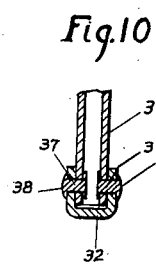

Patented Oct. 26, 1943

2,332,641

UNITED STATES PATENT OFFICE 2,332,641

COUPLING

Augustus P. Jahant, Akron, Ohio

Application May 23, 1941, Serial No. 394,896

4 Claims. (Cl. 285—129)

This invention relates to improvements in a coupling member more particularly adapted for use in joining together the flanged end portions of electrical conduits or ducts, or other members having flanges to be secured together.

It is an object of the invention to provide a coupling member which may be quickly and easily secured to a pair of flanges to join the latter together with a minimum of securing means.

Another object is to provide a coupling member formed of a predetermined number of channel members which may be bent or folded to fit a pair of flanges having a predetermined number of sides.

A further object is to provide a coupling member having means to permit hanging of the member and the conduits which it secures together, and having grounding darts for use with electrical conduits when it is desired to use such conduits as electrical conductors for the purpose of grounding any current passing therethrough.

A further object is to provide novel securing means for holding the coupling member on the flanges.

Other objects and advantages will become apparent from the following description taken in conjunction with the accompanying drawings.

In the drawings:

Fig. 1 is a perspective view of a pair of electrical conduits or ducts to be joined together, Fig. 2 is a similar view showing one form of the coupling member holding the conduits together, Fig. 3 is a side elevation of the form of the coupling shown in Fig. 2, Fig. 4 is an enlarged fragmentary sectional view taken substantially on line 4—4 of Fig. 2, Fig. 5 is a similar sectional view taken substantially on line 5—5 of Fig. 2, Fig. 6 is a side elevation of a modified form of coupling member, Fig. 7 is a side elevation of a pair of the members shown in Fig. 6 shaped to fit flanges of square cross-section, Fig. 8 is an end elevation of a portion of the embodiment shown in Fig. 7, Fig. 9 is a similar view of another portion of the embodiment shown in Fig. 7, and Fig. 10 is a fragmentary sectional view taken substantially on line 10—10 of Fig. 7.

Referring to the drawings the numerals 10 and 11 designate a pair of electrical conduits or ducts having flanges 12 and 13 respectively which flanges are adapted to be joined together to properly align the conduits. These conduits constitute metal raceways or troughs for conveying electric wires and cables and provide protection against damage to the wires and cables. In this instance the conduits and flanges are of square or rectangular cross-section, but they may be of any suitable cross-section. Ordinarily the flanges 12 and 13 are adapted to be bolted together through the bolt openings 14, but my novel coupling member eliminates the need for bolts and provides a quick and accurate means for securing the flanges together.

In the embodiment shown in Figs. 2 to 5 inclusive the coupling member, indicated as a whole by the numeral 15, is formed of four integral sides or sections 16, 17, 18 and 19, and each section is shaped as a channel member in cross-section, as shown in Figs. 4 and 5. Section 16 has an opening 20 through the channel adjacent its free end, as viewed in Fig. 3, and section 19 has a pair of tabs or extensions 21 on its outer end which extend through opening 20 when the sides are folded into square or rectangular shape, as in Figs. 2 and 3.

The coupling 15 is preferably formed from a single length of sheet metal, such as a soft sheet steel, which is first bent into channel shape. The length of the respective sections 16 to 19 is then determined and portions indicated by the openings 22 are cut out, leaving a small portion of metal 23 between each section to serve as a hinge when the sections are folded into square or rectangular shape. After opening 20 is cut in section 16 and tabs 21 are formed on section 19, the coupling is ready for use. In some instances it is desirable to provide means for hanging the coupling and the conduits which it joins together from a wall or from an overhead position, and for this purpose, one or more of the sections, in this case section 17, is provided with a pair of spaced openings 24 which receive straps or other suspension media.

Obviously, it is a simple matter to quickly fit the coupling member 15 around the flanges 12 and 13 as indicated in Fig. 2, to fasten the coupling in place by extending tabs 21 through opening 20 and to spread the tabs apart to insure a tight connection. To enable the end of section 19 to be received in the end of section 16, the channel in the latter may be slightly widened as indicated in Figs. 2 and 5. The sheet metal used may be readily bent to permit this widening. The channel sections receive the flanges 12 and 13 in a relatively tight fit and will hold them together indefinitely. Occasionally the wires and cables carried in the conduits will become bare and a live wire will contact the metal of the conduit. It is therefore desirable to ground the conduits and have them lead any charge passing therethrough to the ground. When it is thus desired to use the conduits as an electrical conductor, metal to metal contact may be insured by providing a plurality of grounding darts 25 at spaced intervals around the coupling. As shown in Fig. 4, these darts are formed by cutting the metal at an angle in two directions and then forcing the sharp end of the cut portion into contact with the metal flanges 12 and 13.

In Figs. 6 to 10 inclusive I have shown a modified form of coupling indicated as a whole by the numeral 30. Coupling 30 is formed of two identical right angular sections, each section comprising two integral sides or sections 31 and 32. To clarify the arrangement, in Fig. 7, one right angular section is shown in full lines and the other in dotted lines, but both are formed in the same manner.

The sides 31 and 32 are also of channel shape in cross-section and are preferably formed from a single length of soft sheet steel. As indicated in Fig. 6, the sheet of metal is first bent into channel shape and then split intermediate its ends on the line 33, forming the sides 31 and 32 and leaving enough metal at the lower end of the split to act as a hinge when the sides are bent at right angles. An opening 34 is formed through the channel in the outer end of side 32 and tabs 35 are formed on the outer end of side 31. Strap receiving openings 36 are formed on side 32 and rivet holes 37 are placed in the walls of each channel in each side 31 and 32 adjacent their inner ends.

Sides 31 and 32 are now bent at right angles with the channels interfitting as shown in Fig. 10. To insure a firm connection at the right angle, rivets 38 are placed through holes 37 to secure the respective walls of the channels together without obstructing the channels. In order to form a square or rectangular coupling with this modified form of the invention it is only necessary to join two right angular sections containing the sides 31 and 32, in the manner indicated in Fig. 7, with the tabs 35 of one section extending through the opening 34 in the other section. The tabs 35 are then spread apart as shown in broken lines in Fig. 8 and the coupling will be tightly held upon the flanges adapted to fit in the channels. If desired, grounding darts may also be used with the modified form of the invention.

It is believed to be apparent that I have provided a novel coupling member which is well adapted to perform the functions intended and which may be quickly and easily placed over any flanges which it is desired to join together. Although the shape of the flanges and coupling herein have been shown as square or rectangular, it will be obvious that any other shape may be utilized within the purview of the invention.

While I have shown and described the preferred embodiments of my invention it will be apparent to those skilled in the art that changes and modifications may be made therein without departing from the spirit of the invention or from the scope of the subjoined claims.

What is claimed is:

1. A coupling of the character described consisting of a one-piece metal structure of channel shape in cross section, said structure comprising a plurality of sections each adapted to embrace a pair of abutting flanges to be coupled, said sections being united with each other by a flexible strip of metal enabling the sections to be bent at an angle to each other, and means for retaining the coupling in position on said flanges.

2. In combination with a pair of flanges to be joined together and having a plurality of sides forming a rectangle, a coupling having a plurality of sections which together define a rectangle, each coupling section being longitudinally straight and formed with a channel which receives a portion of said flanges therein, at least two of said coupling sections being permanently joined together in angular relation by an integral connecting strip that is transversely bent to form one corner of the rectangle, and means for securing said coupling in position with said flanges in said channels.

3. A coupling of the character described comprising a plurality of pairs of longitudinally straight channel members, the members of each pair being permanently connected to each other by an integral intervening transversely bent strip so as to constitute an angular unit, and at least two of said units being joined together to form a geometric figure with each channel member forming a side of said figure.

4. In combination with a pair of flanges to be joined together, a one-piece coupling comprising a series of longitudinally straight channel members permanently connected together end-to-end by transversely bent integral deformable strips arranged to fit over said flanges so as to receive said flanges in said channel members, and means for securing said channel members in position over said flanges, said means comprising a pair of separable tabs formed on the free end of the channel member at one end of the series, the channel member at the other end of the series having its free end provided with an opening to receive said tabs, said tabs being separated after passing through said opening.

AUGUSTUS P. JAHANT.